US012753024B2

(12) United States Patent
Amorati et al.

(10) Patent No.: US 12,753,024 B2
(45) Date of Patent: Oct. 6, 2026

(54) APPARATUS AND METHOD FOR STORING ARTICLES

(71) Applicant: G.D S.P.A., Bologna (IT)

(72) Inventors: Valerio Amorati, Bologna (IT); Manuele Cucchi, Bologna (IT); Giampaolo Gianese, Bologna (IT); Mirco Legnani, Bologna (IT); Luca Testoni, Bologna (IT)

(73) Assignee: G.D S.P.A., Bologna (IT)

( * ) Notice: Subject to any disclaimer, the term of this patent is extended or adjusted under 35 U.S.C. 154(b) by 80 days.

(21) Appl. No.: 18/997,339

(22) PCT Filed: Jul. 18, 2023

(86) PCT No.: PCT/IB2023/057309
§ 371 (c)(1),
(2) Date: Jan. 21, 2025

(87) PCT Pub. No.: WO2024/023639
PCT Pub. Date: Feb. 1, 2024

(65) Prior Publication Data

US 2026/0035187 A1 Feb. 5, 2026

(30) Foreign Application Priority Data

Jul. 25, 2022 (IT) ........................ 102022000015579

(51) Int. Cl.
*B65G 47/69* (2006.01)
*B25J 9/00* (2006.01)
(Continued)

(52) U.S. Cl.
CPC ............ *B65G 47/69* (2013.01); *B65G 43/08* (2013.01); *B65G 47/5104* (2013.01);
(Continued)

(58) Field of Classification Search
CPC .... B65G 47/69; B65G 43/08; B65G 47/5104; B65G 47/71; B65G 47/80; B65G 47/907;
(Continued)

(56) References Cited

U.S. PATENT DOCUMENTS 4,164,997 A * 8/1979 Mueller ................ B65G 47/71 198/441
5,113,996 A * 5/1992 Francioni ............ B65G 47/846 198/723
(Continued)

FOREIGN PATENT DOCUMENTS

EP 1052031 A2 11/2000
EP 2520524 A1 * 11/2012 ......... B65G 47/5104
(Continued)

OTHER PUBLICATIONS

Internatinoal Search Report dated Oct. 16, 2023 from counterpart PCT App No. PCT/IB2023/057309.

*Primary Examiner* — James R Bidwell
(74) *Attorney, Agent, or Firm* — SHUTTLEWORTH & INGERSOLL, PLC; Timothy J. Klima

(57) ABSTRACT

An apparatus for storing articles includes: a feed line, two removal lines and a reservoir therebetween and including a feed station with a feed transfer device operable with a feed line, two pickup stations, each with a pickup transfer device and operable with a removal line, and a movable support with receiving seats movable along a closed path through the feed and pickup stations so the articles are transferred from the feed line to the movable support and the articles are transferred from the movable support to a removal line by a pickup transfer device. A control unit drives the transfer devices based on current capacity values of the feed line and the removal lines to vary the number of articles disposed on the movable support during an imbalance between the
(Continued)

current capacity of the feed line and the current capacity of the removal lines.

12 Claims, 4 Drawing Sheets

(51) Int. Cl.

| | |
|---|---|
| ***B65G 43/08*** | (2006.01) |
| ***B65G 47/51*** | (2006.01) |
| ***B65G 47/71*** | (2006.01) |
| ***B65G 47/80*** | (2006.01) |
| ***B65G 47/90*** | (2006.01) |

(52) U.S. Cl.
CPC ............. *B65G 47/71* (2013.01); *B65G 47/80* (2013.01); *B65G 47/907* (2013.01); *B25J 9/0084* (2013.01); *B25J 9/0093* (2013.01); *B65G 2814/0302* (2013.01)

(58) Field of Classification Search
CPC ............ B65G 2814/0302; B25J 9/0084; B25J 9/0093
USPC .......................................................... 198/441
See application file for complete search history.

(56) References Cited

U.S. PATENT DOCUMENTS

| | | | | |
|---|---|---|---|---|
| 8,638,509 | B2 * | 1/2014 | Blasenheim | G01N 21/6452 359/822 |
| 2009/0214324 | A1 * | 8/2009 | Grinnell | A01G 9/143 414/467 |
| 2021/0122054 | A1 | 4/2021 | Sun | |

FOREIGN PATENT DOCUMENTS

| | | | | |
|---|---|---|---|---|
| EP | 2757043 | A1 * | 7/2014 | B65G 47/082 |
| SE | 1830136 | A1 | 10/2019 | |

* cited by examiner

APPARATUS AND METHOD FOR STORING ARTICLES

This application is the National Phase of International Application PCT/IB2023/057309 filed Jul. 18, 2023 which designated the U.S.

This application claims priority to Italian Patent Application No. 102022000015579 filed Jul. 25, 2022, which application is incorporated by reference herein.

TECHNICAL FIELD

This invention relates to an apparatus and a method for storing articles. More specifically, the invention relates to an apparatus and a method for transferring articles, capable of storing the articles or releasing them in the event of variations between the flows of incoming and outgoing articles, hence as a function of imbalances between input and output.

The invention addresses the sector of industrial processes for the production, processing and packaging of articles in general. The type of articles, therefore, is not a limiting factor in the context of this invention. Whatever the case, by "article" is meant, preferably, a single object which can be gripped, transported and released individually. By way of a non-exhaustive example, the following may be considered articles according to this invention: food or confectionery products; components or sub-units of electronic cigarettes; electronic components; small mechanical parts.

BACKGROUND ART

Known in the prior art are product reservoirs, multi-level in some cases, provided with input and output transfer devices. These, however, have complex structures which require stringent FIFO (first in first out) or LIFO (last in first out) programs.

In particular, tower solutions are known, where the products are stored on different levels and taken in or out by suitable transfer devices which must constantly move in three dimensions, vertically to reach the necessary level and horizontally in a plane at the level reached.

Also known are moving belt reservoirs, for example, in the cigarette sector, for temporarily storing a mass of cigarettes of variable volume along a helical path. This solution, which may involve both LIFO and FIFO systems, requires large, complex structures and, potentially, even long-term product storage and the impossibility of selecting specific quantities of the product to be withdrawn.

DISCLOSURE OF THE INVENTION

The Applicant has noticed that these solutions can be improved in terms of accessibility, that is to say, versatility in the product input and output procedures.

In this context, the basic technical purpose of this invention is to provide an apparatus and a method for storing articles to overcome the above mentioned disadvantages of the prior art.

In particular, the aim of this invention is to provide an apparatus and a method for storing articles which achieve improved accessibility compared to the prior art.

The technical purpose indicated and the aim specified are substantially achieved by an apparatus and a method for storing articles comprising the technical features set out in claims 1 and 11 and/or in one or more of the claims dependent thereon.

BRIEF DESCRIPTION OF THE DRAWINGS

Further features and advantages of this invention are more apparent in the exemplary, hence non-limiting description of a preferred but non-exclusive embodiment of an apparatus and a method for storing articles, as illustrated in the accompanying drawings, in which.

DETAILED DESCRIPTION OF PREFERRED EMBODIMENTS OF THE INVENTION

Figure 1:
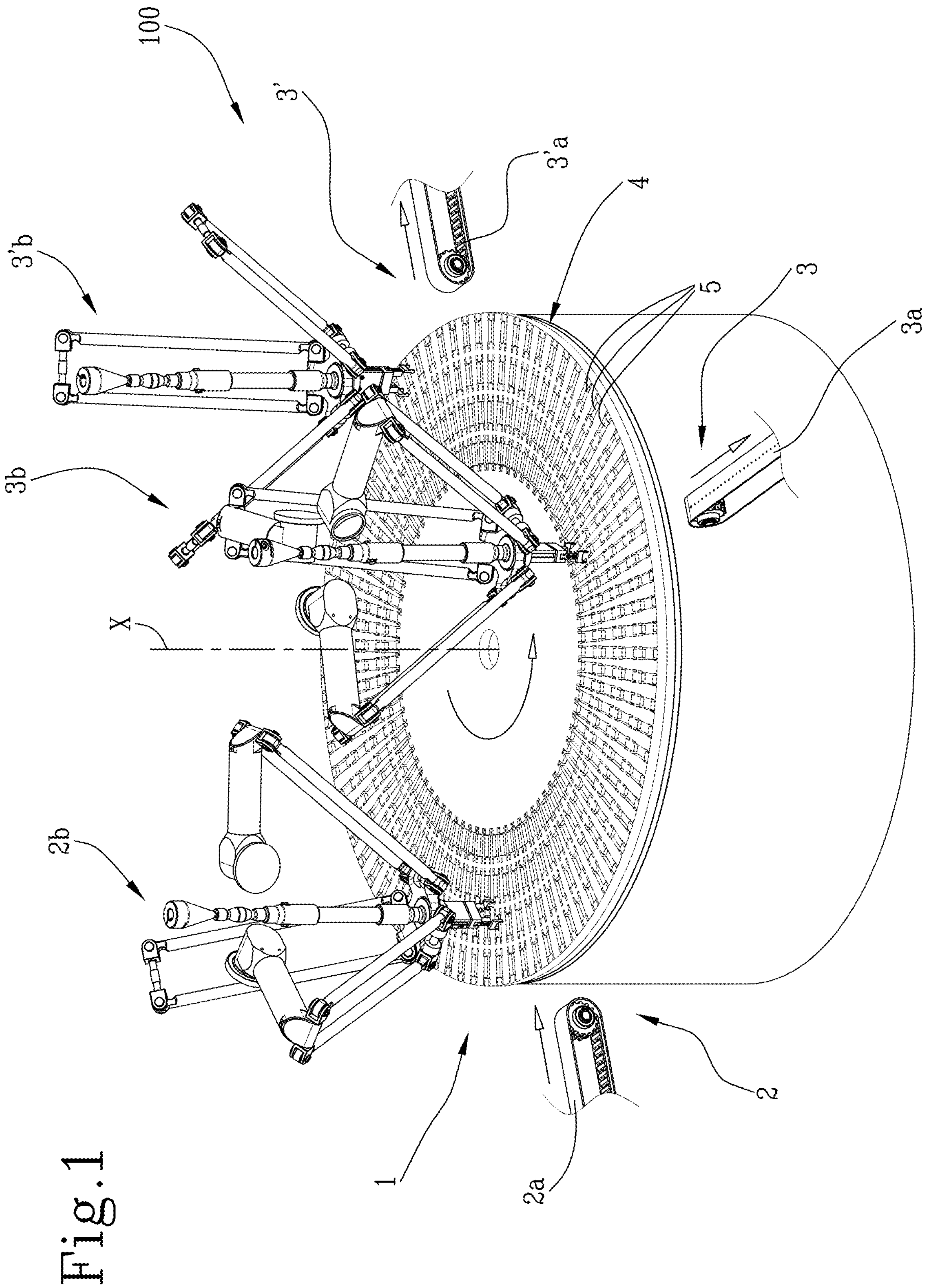
FIG. 1 is a simplified perspective view of an apparatus according to this invention, in a first embodiment.

The numeral 100 in the accompanying drawings denotes in its entirety an apparatus for storing articles according to this invention, suitable for transferring and temporarily storing articles.

In the context of this invention, the term "articles" is used to denote products of diverse kinds such as, by way of non-limiting example: food or confectionery products; components or sub-units of electronic cigarettes; electronic components; small mechanical parts.

Regardless of the type of product, the apparatus 100 is suitable for working between a production line upstream and a processing or packaging line downstream, to hold or deliver articles when the capacities of the lines upstream and downstream are imbalanced.

The apparatus 100 comprises at least one feed line 2*a* for feeding articles, at least two removal lines 3*a*, 3'*a* for removing articles and a reservoir 1 interposed between the feed line 2*a* and the two removal lines 3*a*, 3'*a*.

In the specific embodiment illustrated, the apparatus 100 comprises a single feed line 2*a* for feeding articles and two removal lines 3*a*, 3'*a* for removing articles. More generally speaking, according to the invention, there are more pickup stations 3, 3' than there are feed stations 2.

The removal lines 3*a*, 3'*a* may lead to respective processing lines which are identical and/or juxtaposed, or they may lead to a single processing line where the two respective flows of articles merge.

In this situation, each feed line 2*a* has a nominal capacity that is greater than the nominal capacity of each of the removal lines 3*a*, 3'*a*, preferably equal to the sum of the nominal capacities of the removal lines 3*a*, 3'*a*. In particular, in the specific embodiment illustrated, the feed line 2*a* has a nominal capacity that is twice that of each removal line 3*a*, 3'*a*.

In the context of this disclosure, the expression "current capacity" means the quantity (or flow) of articles per unit time (measured, for example, in articles/second or articles/minute). This capacity may be "nominal" when it refers to a standard, continuing operating condition of the line being considered, or "current" when a specific instant in time is being considered. In particular, therefore, the current capacity may differ from the nominal capacity on account of changed conditions on the line (stoppages, slowdowns, and so on).

As shown in FIG. 1, the reservoir 1 comprises a feed station 2 (more generally speaking, one for each feed line 2*a*), equipped with a respective feed transfer device 2*b*, and two pickup stations 3, 3' (more generally speaking, one for each removal line 3*a*, 3'*a*), each equipped with a respective pickup transfer device 3*b*, 3'*b*.

The reservoir 1 also comprises a movable support 4 provided with a plurality of receiving seats 5 for receiving articles (not illustrated) and configured to move the receiving seats 5 along a closed path passing through the feed station 2 and the pickup stations 3, 3' so that the articles are fed to the movable support 4 by the feed transfer device (or devices) 2*b*, and the articles are removed from the movable support 4 by the pickup transfer devices 3*b*, 3'*b*.

The reservoir 1 is configured to move individual articles towards and away from the movable support 4; in other words, the transfer devices 2*b*, 3*b*, 3'*b* are configured to pick up, transfer and release one single article at a time (according to the embodiment illustrated). Alternatively, the transfer devices 2*b*, 3*b*, 3'*b* may be configured to pick up, transfer and release a group of articles at a time.

The transfer devices 2*b*, 3*b*, 3'*b* illustrated are in the form of articulated arms. They may, however, be embodied in any form, for example, Cartesian actuators, anthropomorphic robots and so on.

Preferably, the receiving seats 5 are distributed on the movable support 5 according to a two-dimensional distribution, in particular, in a plurality of longitudinal rows (circles) running alongside each other.

The movable support 4 may be embodied in different ways.

Figure 2:
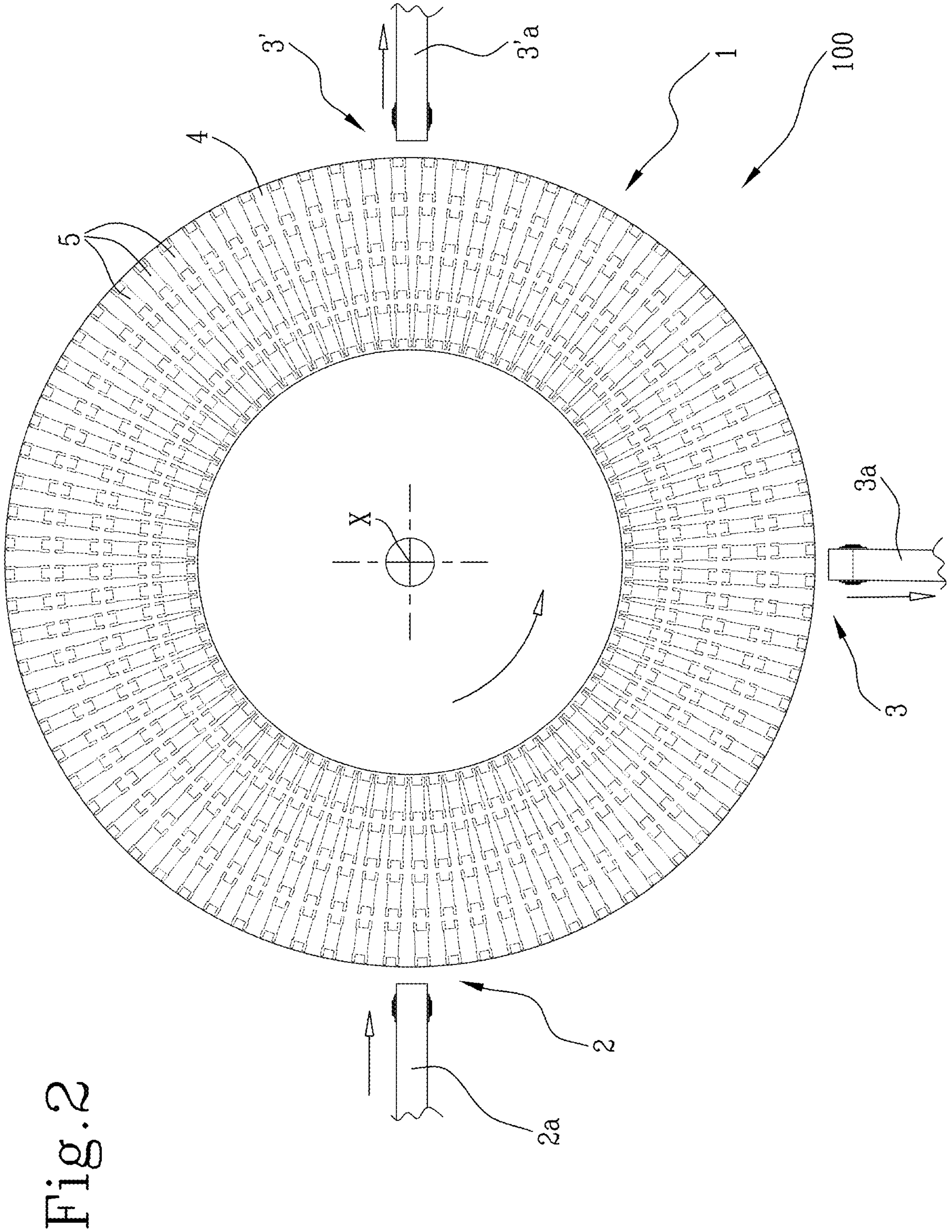
FIG. 2 shows a schematic plan view of the apparatus of FIG. 1.

FIGS. 1 and 2 illustrate a first embodiment, where the movable support 4 is made in the form of a carousel or rotary disc, in particular, rotating about a vertical axis X. The carousel or rotary disc has an integral structure, that is to say, all the receiving seats 5 are movable along the closed path simultaneously. Preferably, the movable support 4 moves with continuous motion, in particular at a constant speed, along the closed path.

Figure 3:
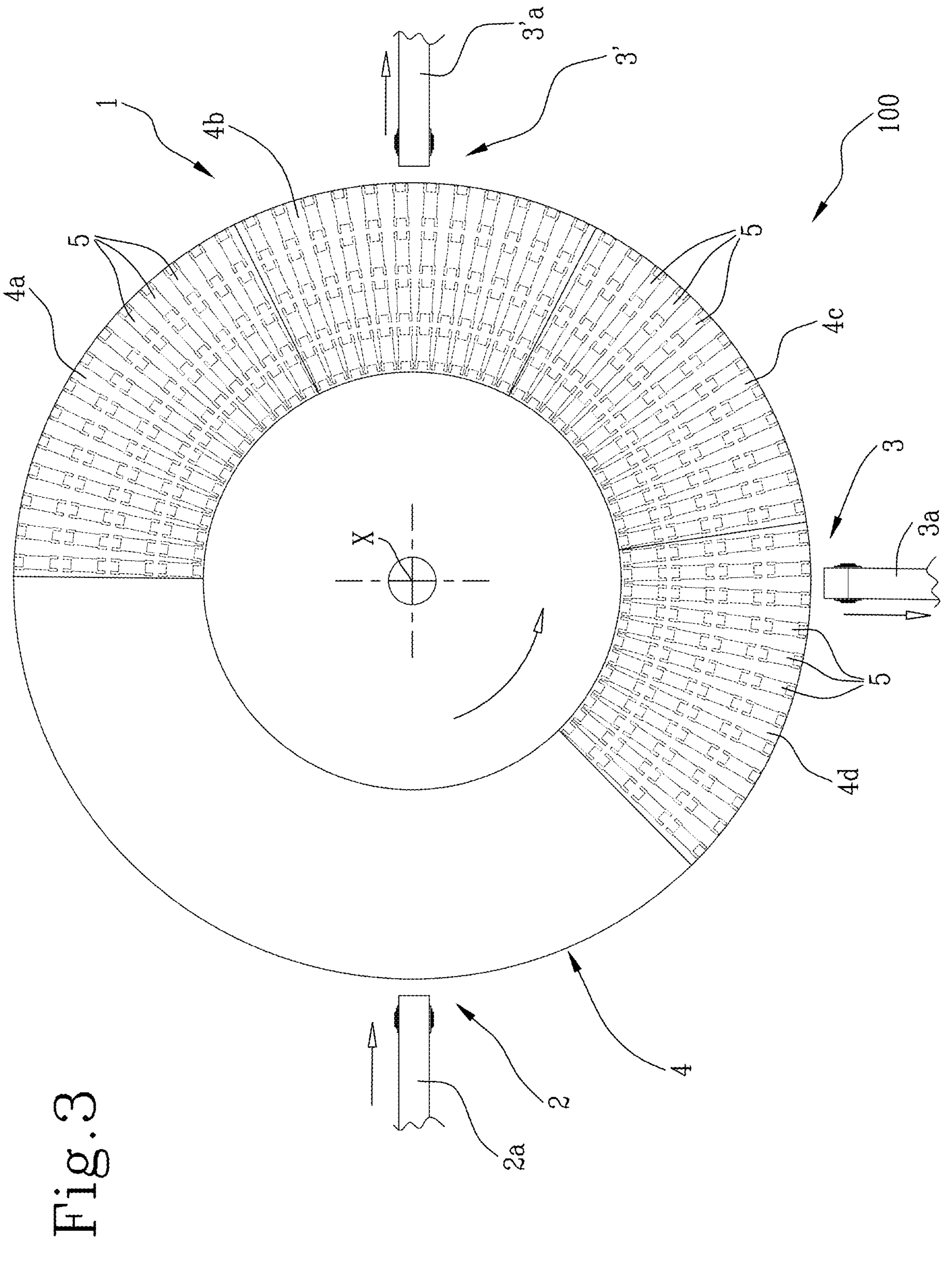
FIG. 3 shows a schematic plan view of an apparatus according to this invention, in a second embodiment.
Figure 4:
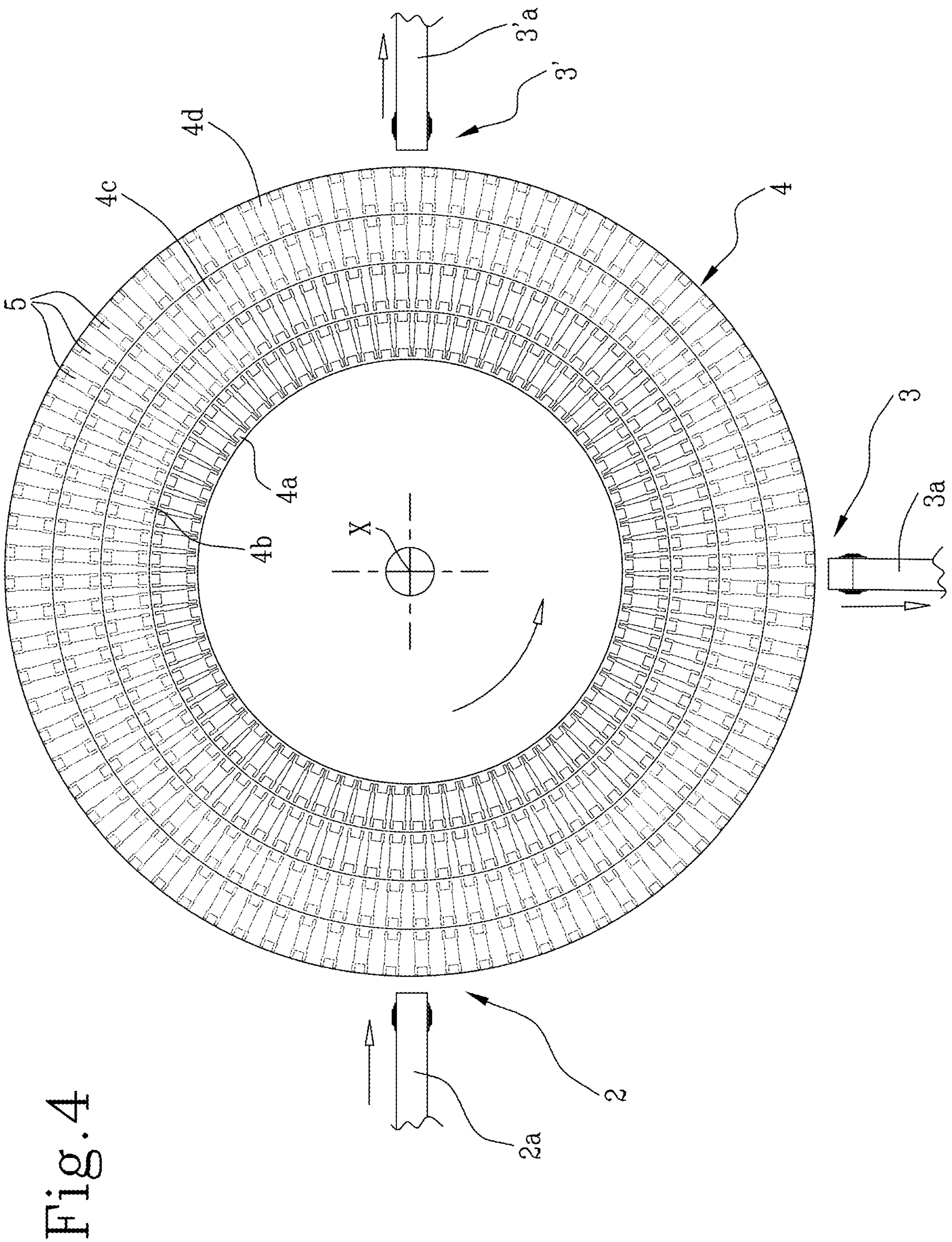
FIG. 4 shows a schematic plan view of an apparatus according to this invention, in a third embodiment.

Alternatively, as shown in FIGS. 3 and 4, the movable support 4 comprises a plurality of sectors 4*a*, 4*b*, 4*c*, 4*d*, each having a plurality of receiving seats 5 and movable independently of each other along the closed path. There may be any number of sectors, preferably two, three, four or more than four. In the embodiments illustrated in FIGS. 3 and 4, there are four such sectors. The sectors 4*a*, 4*b*, 4*c*, 4*d* define respective planar supporting surfaces, provided with receiving seats 5, and coplanar with each other. The supporting surfaces cooperate to define a single, substantially uninterrupted supporting surface of the movable support 4. The sectors 4*a*, 4*b*, 4*c*, 4*d* each comprise a respective independent motor (not illustrated) to move the respective sector 4*a*, 4*b*, 4*c*, 4*d* along the closed path. The motor may be housed in a supporting base of the sectors 4*a*, 4*b*, 4*c*, 4*d* and may comprise, for example, rack and pinion means or linear motors.

In the embodiment of FIG. 3, the sectors 4*a*, 4*b*, 4*c*, 4*d* are angular sectors, each having an angular size of 60°, so as to cover a total angle of 240°. More generally speaking, regardless of their number, the angular sectors define a total angle of less than 360° and, in particular, between 180° and 300°. Furthermore, the angular sectors preferably have the same angular size and, more preferably, are identical. Preferably, the receiving seats 5 are distributed on each circular sector 4*a*, 4*b*, 4*c*, 4*d* according to a two-dimensional distribution over the entire angular extension of the sectors 4*a*, 4*b*, 4*c*, 4*d* or over a part thereof.

In the embodiment of FIG. 4, the sectors 4*a*, 4*b*, 4*c*, 4*d* are circular sectors having a preferably closed (annular) shape and being coaxial with each other. The circular sectors 4*a*, 4*b*, 4*c*, 4*d* are radially nested into each other so as to be disposed in sequence along a radial direction towards the axis X. Preferably, in this case too, the receiving seats 5 are distributed on each circular sector 4*a*, 4*b*, 4*c*, 4*d* according to a two-dimensional distribution over the entire circumferential extension of the sectors 4*a*, 4*b*, 4*c*, 4*d* or over a part thereof.

Preferably, the apparatus 100 also comprises detecting means (not illustrated) for detecting a filled condition of at least some of the receiving seats 5. In particular, the detecting means can detect a filled condition only of the receiving seats 5 that are currently within the operating ranges of the transfer devices 2*b*, 3*b*, 3'*b*, or a filled condition of the receiving seats 5 located in portions of the movable support 4 outside the operating ranges of the transfer devices 2*b*, 3*b*, 3'*b*, or a filled condition of all the receiving seats 5 on the movable support 4.

Preferably, the detecting means are configured to detect the filled condition at predetermined time intervals, in particular, at time intervals preferably shorter than the time that elapses between the passage of one receiving seat 5 and the next receiving seat 5. More preferably, detection occurs at a frequency greater than or equal to 5 Hz, which, in the context of this use, corresponds to continuous or "quasi-continuous" detection.

In a preferred embodiment, the detecting means comprise one or more cameras, for example, located above the movable support 4.

In an alternative solution, the detecting means are presence sensors inside each receiving seat 5 and configured to generate an article present and/or absent signal at the aforesaid predetermined frequency or to detect an absent/present variation condition and vice versa.

The detecting means thus generate respective (optical and/or electrical) signals identifying the filled condition of at least some of the receiving seats 5 of the movable support 4.

The apparatus 100 also comprises a control unit (not illustrated) connected to the transfer devices 2*b*, 3*b*, 3'*b* and configured to drive the transfer device 2*b*, 3*b*, 3'*b* as a function of the current capacity values of the feed line 2*a* and of the removal lines 3*a*, 3'*a*. In particular, the control unit is configured to drive each transfer device 2*b*, 3*b*, 3'*b* independently and at a variable transfer frequency or speed, for example, greater if the respective feed/removal line 2*a*, 3*a*, 3'*a* is fully operational, and smaller if the respective feed/removal line 2*a*, 3*a*, 3'*a* is operating at a reduced capacity (for example, on account of slowdowns in production or processing units upstream), and even to stop the transfer device 2*b*, 3*b*, 3'*b* completely if the respective feed/removal line 2*b*, 3*b*, 3'*b* is down.

Furthermore, the control unit is connected to the detecting means and configured to operate according to a programmed logic of driving the transfer devices 2*b*, 3*b*, 3'*b* as a function of the filled conditions received from the detecting means, so as to place the articles in receiving seats 5 detected as being currently available and/or to pick up articles from receiving seats 5 detected as currently containing an article.

In particular, therefore, the control unit comprises one or more drive logics used to determine the sequence of releasing the articles into the receiving seats 5 or picking up the articles from the receiving seats 5, taking into account not only the current capacity conditions of the feed line 2*a* and of the removal lines 3*a*, 3'*a* but also the current distribution of the articles (full/empty seats 5) on the movable support 4.

For example, with reference to the embodiment of FIGS. 1 and 2, the control unit may be configured to make the articles distributed on the movable support 4 more closely packed or thinned out, in particular progressively and evenly over the whole surface of the movable support 4, so as to prevent individual sub-areas of the movable support 4 from being filled completely (or emptied completely), while other sub-areas are, at the same time, only partially filled). This has the effect of optimizing the distribution of the articles in that, mainly in the case of continuous advancing motion of the receiving seats 5 along the closed path, each feed station 2 would always have empty receiving seats 5 available to it, and each removal station 3 would always have available it full receiving seats 5 from which articles can be picked up. If this were not the case, hence in the case of areas (or "islands") that are all full or all empty, the corresponding feed station 2 or removal station 3 would have to stop and wait for the next instant, thereby going "out of step" or creating delays which, in some operating conditions, might not be able to be compensated.

The effect of packing more closely or of thinning out must be understood as "distributed" over the entire surface of the movable support 4 and not only locally in specific areas thereof.

In other words, therefore, the control unit contains one or more drive logics, such as to:

- drive the feed transfer device 2*b* in such a way as to gradually make the articles more closely packed on the movable support 4 gradually by not filling some areas completely, excepting the completely full condition that would take place in the last cycle (rotation) of the movable support 4; and/or
- drive the pickup transfer devices 3*b*, 3'*b* in such a way as to gradually thin out the articles on the movable support 4 gradually by not emptying some areas completely, excepting the completely empty condition that would take place in the last cycle (rotation) of the movable support 4.

In an example embodiment, a control logic might be that of releasing the articles onto the movable support 4 in order to fill it in "checkerboard" or similar fashion, to create a predetermined number of alternate empty and full receiving seats 5, and similarly, to pick up the articles from the movable support 4 so that the articles remaining are also arranged in "checkerboard" fashion.

With reference to the embodiments of FIGS. 3 and 4, the control unit is, instead, configured for moving the sectors 4*a*, 4*b*, 4*c*, 4*d* independently, for example, in such a way that the feed transfer device 2*b* operates on the same sector 4*a*, 4*b*, 4*c*, 4*d*, until that sector 4*a*, 4*b*, 4*c*, 4*d* is completely full before starting to work on another sector 4*a*, 4*b*, 4*c*, 4*d* and/or in such a way that each pickup transfer device 3*b*, 3'*b* operates on the same sector 4*a*, 4*b*, 4*c*, 4*d*, until that sector 4*a*, 4*b*, 4*c*, 4*d* is completely empty before starting to work on another sector 4*a*, 4*b*, 4*c*, 4*d*.

Preferably, also, the control unit is configured to temporarily disable a pickup transfer device 3*b*, 3'*b* to at least partly compensate for a production capacity imbalance between the feed line 2*a* and the removal lines 3*a*, 3'*a* when the imbalance exceeds a predetermined threshold. In effect, in this situation, the article feed flow would be too slow to justify the action of both of the pickup transfer devices 3*b*, 3'*b* and, at the same time, the simultaneous action of both of the pickup transfer devices 3*b*, 3'*b* would cause the movable support 4 to be emptied quickly.

In this case, therefore, the control unit is configured to monitor a current capacity value of each of the feed and pickup lines 2*a*, 3*a*, 3'*a*, to determine the total current feed capacity and the total current pickup capacity and to determine a current imbalance defined by the difference between these total capacities. If the difference between the total capacities is greater than a preset threshold, the control unit is configured to temporarily disable one of the pickup stations 3, 3' to at least partly compensate for the imbalance, and preferably to reactivate it when the imbalance returns below the preset threshold.

The invention achieves the preset aim, overcoming the disadvantages of the prior art.

Indeed, the apparatus 100 is configured to fill/empty the receiving seats 5 of the reservoir 1 in a gradual and distributed manner so that there are receiving seats 5 available to receive or deliver articles at all times, thus optimizing the accessibility of the reservoir 1 to the transfer devices. This is optimized specifically for situations where the nominal capacity of each feed line is different from, in particular greater than, the nominal capacity of each removal line, a situation that occurs, for example, when the production line upstream is higher-performing in terms of article flow compared with the processing (or packaging) units downstream.

The invention claimed is:

1. An apparatus for storing articles, comprising:

at least one feed line for feeding articles;

at least two removal lines for removing articles;

a reservoir interposed between the at least one feed line and the removal lines, the reservoir comprising:

at least one feed station equipped with a feed transfer device and associated with a respective feed line for feeding articles;

at least two pickup stations, each equipped with a pickup transfer device and associated with a respective removal line for removing articles;

a movable support provided with a plurality of receiving seats for receiving articles and configured to move the receiving seats along a closed path passing through the feed station and the pickup stations so that the articles are transferred from the feed line to the movable support by the feed transfer device and the articles are transferred from the movable support to a respective removal line by a respective pickup transfer device;

wherein the apparatus also comprises a control unit, connected to the transfer devices and configured to drive the transfer devices (2*b*, 3*b*, 3'*b*) according to a predetermined logic as a function of current capacity values of the feed line and of the removal lines so as to vary the number of articles disposed on the movable support in the event of an imbalance between the current capacity of the feed line and the current capacity of the removal lines.

2. The apparatus according to claim 1, wherein the pickup lines are greater in number than the at least one feed station, there being preferably two pickup stations and one feed station.

3. The apparatus according to claim 1, wherein the feed line has a nominal capacity that is greater than the nominal capacity of each of the removal lines, preferably equal to the sum of the nominal capacities of the removal lines.

4. The apparatus according to claim 1, further comprising detecting means for detecting a filled condition of at least some of the receiving seats, wherein the control unit is configured to drive the transfer devices as a function of the filled conditions received from the detecting means, so as to place the articles in receiving seats detected as being currently available and/or to pick up articles from receiving seats detected as currently containing an article.

5. The apparatus according to claim 1, wherein the receiving seats are distributed on the movable support according to a two-dimensional distribution, in particular, in a plurality of longitudinal rows running alongside each other.

6. The apparatus according to claim 1, wherein the movable support is made in the form of a carousel or rotary disc, in particular, rotating about a vertical axis.

7. The apparatus according to claim 1, wherein all the receiving seats are movable along the closed path simultaneously.

8. The apparatus according to claim 1, wherein the receiving seats move along the closed path continuously, preferably at a constant speed.

9. The apparatus according to claim 1, wherein the feed transfer device and/or the pickup transfer devices are configured for individually transferring single articles and are preferably embodied in the form of motor-driven or robotized arms.

10. The apparatus according to claim 1, wherein the control unit is also configured to temporarily disable a pickup transfer device to at least partly compensate for a production capacity imbalance between the feed line and the removal lines when the imbalance exceeds a predetermined threshold.

11. A method for storing articles, implemented by an apparatus according to claim 1, comprising the following steps:

moving the movable support so as to move the receiving seats along the closed path passing through the feed station and the pickup stations;

transferring a succession of articles from the feed line to the movable support by means of the feed transfer device;

transferring the articles from the movable support to the removal lines by means of the pickup transfer devices;

wherein the steps of transferring are carried out according to at least one predetermined logic of driving the transfer devices as a function of the current capacity values of the feed line and of the removal lines so as to vary the number of articles disposed on the movable support in the event of an imbalance between the current capacity of the feed line and the current capacity of the removal lines.

12. The method according to claim 11, further comprising a step of temporarily disabling a pickup transfer device to at least partly compensate for a production capacity imbalance between the feed line and the removal lines when the imbalance exceeds a predetermined threshold.

* * * * *